United States Patent
Nahhas et al.

(10) Patent No.: US 11,673,790 B2
(45) Date of Patent: Jun. 13, 2023

(54) METHODS AND SYSTEMS FOR DISPENSING FUEL

(71) Applicant: INSTAFUEL LLC, Houston, TX (US)

(72) Inventors: Wisam Nahhas, Houston, TX (US); Joshua Stolberg, Houston, TX (US); Nour Baki, Houston, TX (US)

(73) Assignee: SHELL RETAIL AND CONVENIENCE OPERATIONS LLC ( * ) Notice: Subject to any disclaimer, the term of this patent is extended or adjusted under 35 U.S.C. 154(b) by 0 days.

(21) Appl. No.: 17/348,721

(22) Filed: Jun. 15, 2021

(65) Prior Publication Data
US 2022/0396467 A1 Dec. 15, 2022

(51) Int. Cl.
B67D 7/32 (2010.01)
B67D 7/36 (2010.01)
B67D 7/30 (2010.01)

(52) U.S. Cl.
CPC .......... *B67D 7/3281* (2013.01); *B67D 7/302* (2013.01); *B67D 7/36* (2013.01)

(58) Field of Classification Search
CPC ........ B67D 7/3281; B67D 7/36; B67D 7/302; B67D 2007/0448; B67D 7/04; B60K 15/00
See application file for complete search history.

(56) References Cited

U.S. PATENT DOCUMENTS

| | | | | |
|---|---|---|---|---|
| 5,333,498 A | * | 8/1994 | Brackett | B67D 7/08 73/198 |
| 5,400,253 A | * | 3/1995 | O'Connor | G07F 9/002 705/413 |
| 7,258,098 B2 | * | 8/2007 | Kim | F02D 19/087 123/198 D |
| 7,597,252 B1 | * | 10/2009 | Dewitt | G07F 13/025 235/380 |
| 2006/0157142 A1 | | 7/2006 | Hillam et al. | |
| 2006/0190129 A1 | * | 8/2006 | DeLine | G06Q 20/40145 700/232 |
| 2012/0158192 A1 | | 6/2012 | Sherwood | |
| 2016/0023886 A1 | * | 1/2016 | Braden | B67D 7/348 141/94 |
| 2016/0221818 A1 | * | 8/2016 | Gotz | G06Q 50/06 |
| 2017/0154301 A1 | | 6/2017 | Stevenson et al. | |
| 2018/0022596 A1 | * | 1/2018 | Grice | B67D 7/302 141/1 |

(Continued)

FOREIGN PATENT DOCUMENTS

WO WO-2019070832 A1 * 4/2019 ............. B60K 15/03
WO 2019236032 A2 12/2019

*Primary Examiner* — Nicolas A Arnett

(57) ABSTRACT

A method and system of dispensing a fuel from a fuel tank to a recipient fuel tank. The method includes scanning a tag by a scanner from a smart device, wherein the smart device also comprises a communications processor, recording an initial inventory level of the fuel in the fuel tank, estimating a density of the fuel, opening a valve to dispense a predetermined amount of the fuel, and recording a final inventory level after the dispensing the fuel, upon estimating that the density of the fuel is within a predetermined range, and shutting the valve and communicating to relevant personnel about the difference in fuel density, upon estimating that the density is outside of the predetermined range.

20 Claims, 2 Drawing Sheets

(56) References Cited

U.S. PATENT DOCUMENTS

| | | | |
|---|---|---|---|
| 2018/0349919 A1 | 12/2018 | Akgun et al. | |
| 2019/0144258 A1* | 5/2019 | Cloutier | B67D 7/049 |
| | | | 141/44 |
| 2020/0207606 A1* | 7/2020 | Bulgurcu Bilgen | G01N 11/10 |

* cited by examiner

METHODS AND SYSTEMS FOR DISPENSING FUEL

TECHNICAL FIELD

The present disclosure relates generally to dispensing fuel, and more specifically to methods and systems for checking the right kind of fuel of the appropriate purity is being dispensed for a particular vehicle.

BACKGROUND

A motor vehicle, also known as motorized vehicle or automotive vehicle, is a self-propelled vehicle moving on land, air and water. All motorized vehicles consume fuel ranging from petrol, diesel, gas, ethanol or any other type of combustible fuel.

All refueling stations, including mobile refueling tanks that provide on-site refueling, generally provide at least two types of fuels—gasoline and diesel. Ethanol is also being offered as an option in many refueling stations. It is discouraged to refuel a gasoline vehicle with diesel or vice versa, as such mixing of fuels will lead to disastrous consequences for the engine. Further, within a certain type of fuel, different grades are available, and each grade may not be compatible with another grade, depending on the type of fuel.

The quality of the fuel being used in the vehicle is one of the key features that determines many different aspects, such as, but not limited to, smooth combustion of the fuel, engine performance, longevity of the engine, and the like. It is very likely that the fuel may be contaminated with some additives or moisture. For example, on a very humid day, when the tank is not sealed air-tight, moisture condensation inside the tank will lead to greater moisture content than the acceptable levels. This may cause problems for the engine performance, both in the short term as well as in the long run.

Existing refueling stations may have the infrastructure to check for various parameters such as presence of contaminants, extent of contamination etc. However, there is still no solution for a situation where a person fills a wrong type of fuel, for example fills a gasoline tank with diesel fuel.

In the case of mobile fueling stations, there is no solution towards ensuring that the right type of fuel is being used for a particular fuel tank, nor is there any solutions to identify and measure extent of contaminants in a fuel. With increasing use of mobile refueling tanks, there is a need for suitable solutions to ensure that the right type of fuel is being dispensed for a vehicle and that the fuel itself lives up to a certain quality standard in ways that overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method of dispensing a fuel from a fuel tank to a recipient fuel tank. The method includes scanning a tag by a scanner from a smart device, wherein the smart device also includes a communications processor, recording an initial inventory level of the fuel in the fuel tank, estimating a density of the fuel, opening a valve to dispense a predetermined amount of the fuel, and recording a final inventory level after the dispensing the fuel, upon estimating that the density of the fuel is within a predetermined range, and shutting the valve and communicating to relevant personnel about the difference in fuel density, upon estimating that the density is outside of the predetermined range.

Certain embodiments disclosed herein also include a non-transient computer readable medium including instructions for performing the method as described herein.

Certain embodiments disclosed herein further include a fuel dispensing system. The system includes a (i) fuel tank, which includes a density detection sensor; an inventory level detection sensor; (ii) a recipient fuel tank that includes a tag; and (iii) a smart device that includes a tag reader to read the tag; a communications processor; a memory that includes instructions for the smart device based on the method as described herein; and a microprocessor that is configured to execute the instructions, process sensor data also as described herein, and communicate the executed instructions.

Certain embodiments disclosed herein also includes a system for dispensing fuel, including a processing circuitry, and a memory, the memory containing instructions that, when executed by the processing circuitry, configure the system to scan a tag by a scanner from a smart device, wherein the smart device also comprises a communications processor, record an initial inventory level of the fuel in the fuel tank, estimate a density of the fuel, open a valve to dispense a predetermined amount of the fuel, and recording a final inventory level after the dispensing the fuel, upon estimating that the density of the fuel is within a predetermined range, and shut the valve and communicating to relevant personnel about the difference in fuel density, upon estimating that the density is outside of the predetermined range.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
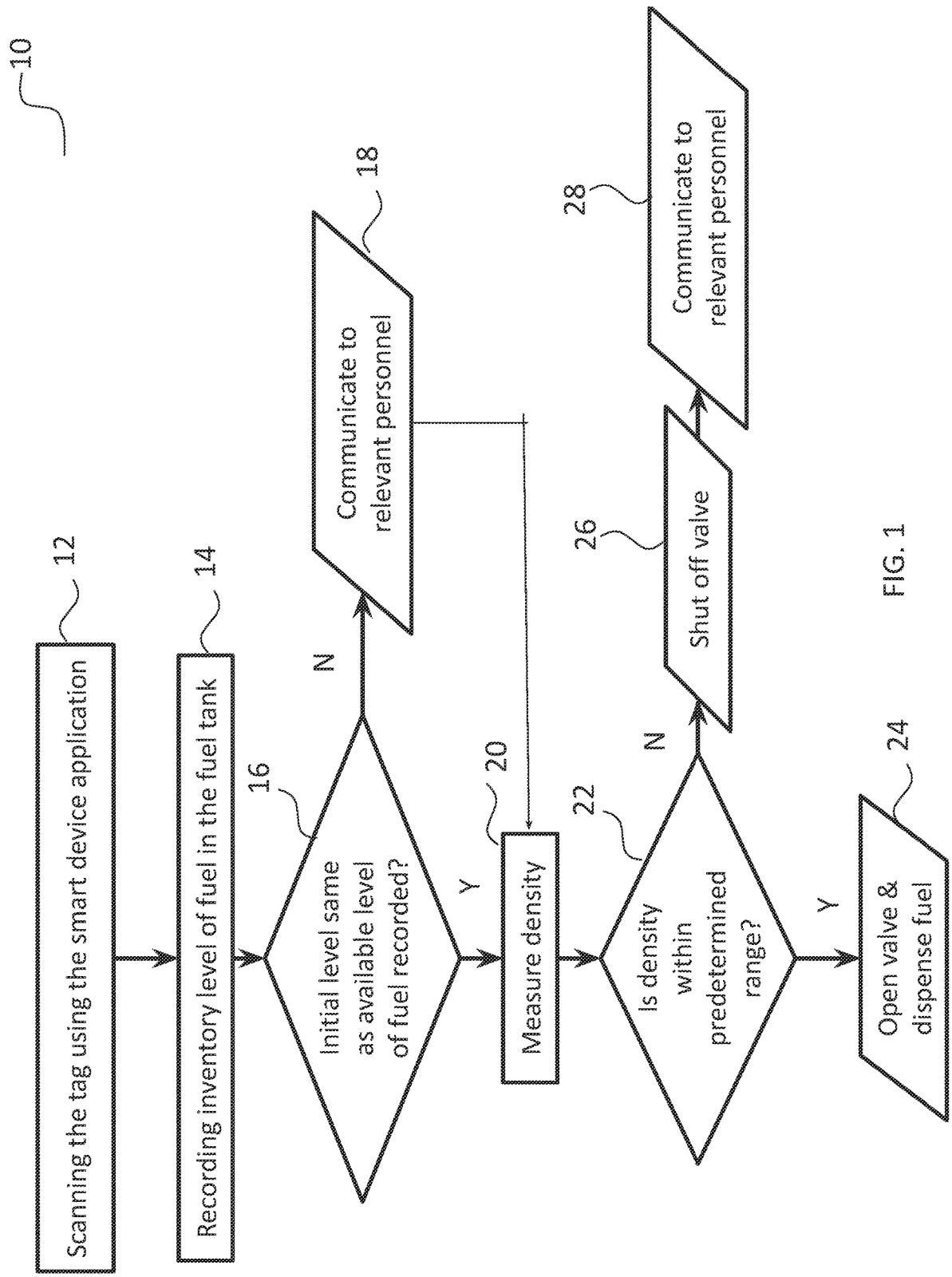
FIG. 1 is a flowchart of a method for dispensing fuel, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dispensing a fuel from a fuel tank into a recipient fuel tank. The fuel tank includes a fuel meter to measure the amount of fuel dispensed, a valve to control flow of the fuel, a density detection sensor, and an inventory level detection sensor. The recipient fuel tank includes a tag. The tag is at least one of RFD tags, optical code tags, near field communication ("NFC") tags, acoustic tags, and so forth. The method includes scanning the tag by a scanner in a smart device application to obtain information related to the fuel, such as fuel type, expected density range, and the like. The smart device application is run on a suitable platform such as Android OS, iOS, or Windows OS and includes a communications processor capable of sending a short message service, an email, and combinations thereof. The method then includes recording an initial inventory level of the fuel in the fuel tank, followed by estimating a density of the fuel. Subsequently, the estimated density of the fuel is checked to see if it falls within the predetermined range as read from the tag. The density detection sensor is an in-line detector, and consequently, the density measurement can happen on a real time basis as the fuel is flowing. If the estimated density is within the predetermined range, then the valve is opened to dispense a predetermined amount of the fuel and recording a final inventory level using the inventory level detection sensor after the dispensing of the fuel. If the estimated density is not within the predetermined range, then the valve is shut off, and an alert message is communicated to relevant personnel about the difference in fuel density.

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

As used herein, the term "fuel" is intended to have a relatively broad meaning, referring to liquid fuels such as gasoline, diesel, as well as gaseous fuels such as natural gas, propane or hydrogen.

By the same token, the terms "fueling" and "refueling" are intended to have broad meanings, referring to supplying any of the fuels mentioned above by filling a fuel tank provided on the vehicle, or a portable fuel tank such as a gasoline can, or other similar devices.

As used herein, the term "vehicle" is also intended to have a relatively broad meaning, referring to automobiles, whether driven by a human or autonomous, as well as other vehicles that travel on land, in water or through the air.

Among other things, the embodiments may be implemented in whole or in part as a system, as one or more methods, or as one or more devices. The embodiments may take the form of a hardware, a software, or a combination of software and hardware. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. Further, as used herein, software also includes applications that are run on suitable devices such as mobile phones, tablets, phablets, personal computers, and the like, and combinations thereof. Programs and applications can be built to be device independent and can run on any OS, such as Windows, iOS, Android, MacOS, and so on. Data storage elements such as memory units and the data processing device may be present in a single device such as a mobile phone. Alternately, data storage elements may be present separate from the data processing platforms. For example, data storage elements may be a cloud storage unit wherein data can be uploaded through a suitable connection. The following detailed description is, therefore, not to be taken in a limiting sense.

As noted herein, in an embodiment, a method of dispensing a fuel from a fuel tank into a recipient fuel tank is disclosed. The embodiment may best be implemented as software or a smart device application on a suitable platform such as an Android OS, an iOS, a MacOS, or a Windows OS.

FIG. 1 is a flowchart representation of a method, generally represented by numeral 10, according to an embodiment. The embodiment is explained herein using a smart device application, however, one skilled in the art will understand that the embodiment can also be implemented as software program running on a suitable computing device, and a combination of software program as well as an application running on multiple devices simultaneously.

In the embodiment, the fuel tank includes a valve to control flow of the fuel. The fuel tank is also equipped with an approved fuel meter which, when calibrated, originally is designed strictly for measuring dispensed fuel. The fuel tank also includes a density detection sensor, and an inventory level detection sensor. The density detection sensor is an in-one detector that measures density of the flowing fluid. In this manner, real-time density of the fluid is measured and can be compared to the known density levels of a standard fuel, which is then used to determine the purity of the fuel being dispensed.

The recipient fuel tank includes a tag that may include radio-frequency identification ("RFD"), optical code tags, near field communication ("NFC") tags, acoustic tags, and so forth. In one specific preferred embodiment, the tag is an NFC ID tag. The method 10 involves scanning the tag using the smart device application, as depicted by numeral 12 in FIG. 1. The NEC ID tag includes information related to a fuel type, an allowable fuel density range, and current fuel inventory levels.

The method 10 then includes recording an initial inventory level of the fuel in the fuel tank using the inventory level detection sensor in step 14 in FIG. 1. The initial inventory level of the fuel is compared to an available inventory level from a suitable secondary source, as depicted in step 16 in FIG. 1. The secondary source of the available inventory level may be from a cloud server where the information is stored, which in turn was estimated after a previous fill. Any discrepancies between the initial inventory level and the available inventory level (i.e., if/when the initial inventory level is not the same as the available inventory level) will be communicated to relevant personnel such as the feeler (e.g., the gas station attendant), the fueler's supervisor, shift manager etc., shown in FIG. 1 depicted by numeral 18. Once notified, the relevant personnel can then initiate checking and rectification procedures.

Otherwise, when it is determined that the initial level is the same as the available inventory level of the fuel that is recorded, in step 20 in FIG. 1, the method 10 then includes measuring density of the fuel using the density detection sensor. Since this is an in-line density detection sensor, the density measurement would be a real-time measurement. The measured density is compared to the predetermined range that was made available from the tag, shown in FIG. 1 by 22, following which one of two steps are taken;

- If the actual density of the fuel is within a range deemed appropriate for that fuel type based on expected density, then the valve is opened and the predetermined amount of fuel is dispensed, as seen in step 24 in FIG. 1, The application is configured to store the density data from each fill.
- If the actual fuel density of the fuel is outside (i.e., not within) the range deemed appropriate for that fuel type, the application will shut the valve immediately, shown by numeral 26 in FIG. 1 and communicated to relevant personnel regarding this density mismatch, as shown in step 28 in FIG. 1. The transmission may be accompanied by an alarm in the application to alert the recipient.

As stated already herein, density mismatches could occur due to a number of reasons, possibly because wrong fuel type was attempted to be used, or the fuel is sufficiently contaminated to cause a change in its properties.

According to the embodiments, density may be measured just once at the beginning of the dispensing of the fuel, or it may be measured throughout the course of the fueling. Thus, changes in the density of the fuel through the course of fueling action can be monitored using the smartphone device application.

The communication may be in the form of text messages or SIMS, mails, pop-up notifications, and the like, and combinations thereof. Communicating is achieved through any known manner, which may include, for example, but not limited to, at least one of wireless network, mobile network, Bluetooth, LANs, Wireless-LANs, WANs, Wireless-WANs, and so forth or combinations thereof.

If the measured density is within the range deemed appropriate for that fuel type, then the predetermined amount of fuel is dispensed. Subsequently, the final inventory level is recorded using the inventory level detection sensor in the application. The final inventory level may also be uploaded to a cloud server or a different memory unit. This final inventory level is then used to compare the initial inventory level before the next fueling action. Any discrepancy between the two levels will be communicated to the fueler as well as other relevant personnel.

In some embodiments, the inventory level is measured at regular intervals regardless of whether refueling is occurring or not, and the measured inventory levels are stored in a suitable memory unit and/or communicated to relevant personnel. In this manner, any loss of fuel can be appropriately tracked, which can then be used to identify the causes for the loss and suitable rectification steps can be undertaken.

Enabling the method of the embodiments through an application or software allows for suitable automation of the entire process thereby greatly increasing efficiency and accuracy.

Figure 2:
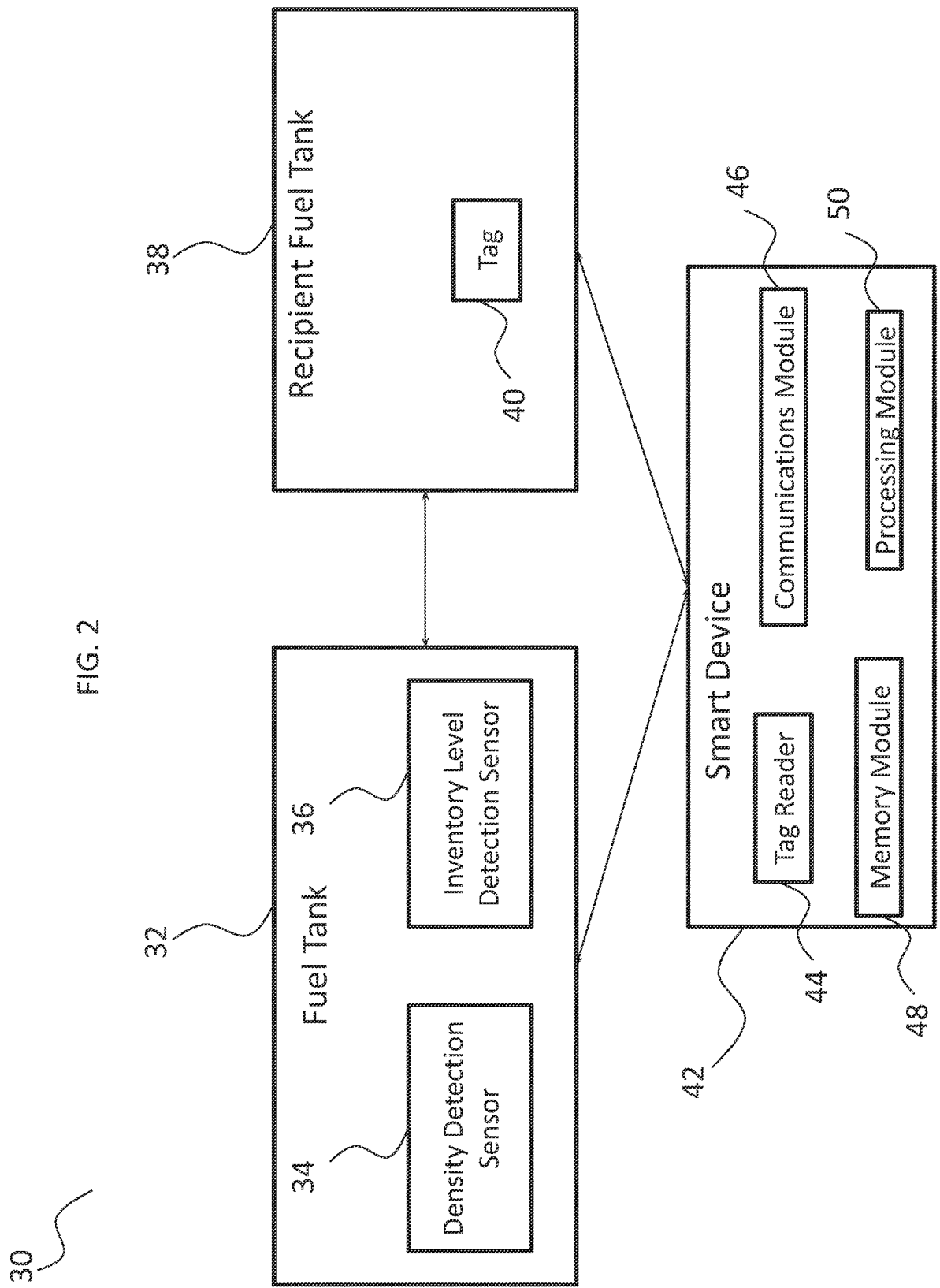
FIG. 2 shows a block diagram of a fuel dispensing system, according to an embodiment.

FIG. 2 is a block diagram of a fuel dispensing system, according to an embodiment and depicted by numeral 30. The system 30 includes a fuel tank 32 as described herein that further includes a density detection sensor 34, and an inventory level detection sensor 36. The system 30 also includes a recipient fuel tank 38 that includes a tag 40. The system 30 also includes a smart device 42 that includes a tag reader 44 (e.g., scanner), a communications module 46 (e.g., communications microprocessor or communications processor), a memory module 48 (e.g., RAM, ROM, hard drive storage, or memory available over the network on cloud) that includes instructions for the smart device 42; and a processing module 50 (e.g., a microprocessor) for executing the instructions, processing sensor data, and executing instructions for communication.

The methods and the system as disclosed ensure that density is measured and compared with the expected range of density for the specific recipient fuel tank being fueled on a real time basis. The expected density range is read off a electronic sensor tag 40 that is conveniently placed on or near the recipient fuel tank. The tag 40 may also store other relevant information related to the recipient fuel tank and the fuel, such as type of fuel (as mentioned earlier), the most recent fuel inventory level, other details associated with the vehicle it is associated with such as, vehicle make, vehicle model, etc. The reading of the tag 40 is achieved using an application or software developed for this purpose. The application is also configured to read the real time density from the density detection sensor and compare it with the expected density.

The comparison has a dual purpose of ensuring that the fuel used for refilling tanks is free of contamination, and no "cross fueling" occurs through fueler's oversight. Thus, the chances of errors such as filling a diesel engine fuel tank with gasoline fuel will be eliminated through the use of the methods and system of the embodiments enabled through the novel software or application as described herein.

While only certain features of the embodiments have been illustrated and described herein, many modifications and changes will occur to those skilled in the art. It is, therefore, to be understood that the appended claims are intended to cover all such modifications and changes as fall within the true spirit of the embodiments.

What is claimed is:

1. A method of dispensing a fuel from a fuel tank to a recipient fuel tank, the method comprising:
    scanning a tag by a scanner from a smart device, wherein the smart device also comprises a communications processor;
    recording an initial inventory level of the fuel in the fuel tank;
    comparing the initial inventory level to a previously recorded inventory level;
    estimating a density of the fuel;
    obtaining a predetermined fuel density range from the scanning of the tag;
    comparing the estimated density of the fuel estimated in real-time with the predetermined fuel density range;
    opening a valve to dispense a predetermined amount of the fuel, and recording a final inventory level after the dispensing the fuel, based on estimating that the density of the fuel is within the predetermined fuel density range;
comparing the final inventory level with the initial inventory level before a next fueling; and
tracking fuel loss outside of the dispensing of the predetermined amount of the fuel, based on the comparing of the initial inventory level with one of the previously recorded inventory level or the final inventory level.

2. The method of claim 1, wherein the fuel tank further comprises:
a fuel meter to measure the predetermined amount of the fuel dispensed;
the valve to control flow of the fuel;
a density detection sensor to measure the density of the fuel; and
an inventory level detection sensor to measure an inventory level of the fuel; and
the tag is included on the recipient fuel tank.

3. The method of claim 2, further comprising keeping the valve from opening and communicating to a relevant personnel, upon determining that there is a mismatch between the initial inventory level and the previously recorded inventory level.

4. The method of claim 3, wherein the communicating is implemented by at least one of wireless network, mobile network, Bluetooth, WAN, LAN, or combinations thereof.

5. The method of claim 3, wherein the communicating to the relevant personnel is through one of a short message service (SMS) or an email.

6. The method of claim 2, wherein the density detection sensor is an in-line sensor, and the estimating of the density is performed at a beginning of the dispensing of the fuel.

7. The method of claim 1 wherein the tag is an NFC ID tag.

8. The method of claim 1, wherein the tag is configured to include information related to: a fuel type; an allowable fuel density range; a current fuel inventory level, or a combination thereof.

9. The method of claim 1, wherein the smart device is configured to run on one of an Android platform, an iOS platform, a MacOS platform, or a Windows platform.

10. A non-transient computer readable medium comprising instructions for performing the method of claim 1.

11. The method of claim 1, wherein the previously recorded estimated inventory level is retrieved from a secondary source, after a previous fill, obtained before the initial inventory level is recorded.

12. The method of claim 1, wherein the comparing of the initial inventory level to the previously recorded inventory level is performed before the estimating of the density of the fuel.

13. The method of claim 1, further comprising keeping the valve from opening and communicating to the relevant personnel, upon determining that the estimated density of the fuel is outside of the predetermined fuel density range, wherein the estimating of the density is performed throughout the dispensing of the predetermined amount of the fuel.

14. A fuel dispensing system, comprising:
a fuel tank that comprises:
a density detection sensor to measure a density of a fuel;
an inventory level detection sensor to measure an inventory of the fuel; and
a recipient fuel tank that comprises a tag;
a smart device that comprises:
a tag reader to scan the tag;
a communications processor;
a memory that comprises instructions for the smart device; and
a microprocessor that is configured to execute the instructions, process sensor data, and communicate the executed instructions, wherein
the microprocessor, upon executing the instructions and processing the sensor data, is further configured to:
record an initial inventory level of the fuel in a fuel tank;
compare the initial inventory level to a previously recorded inventory level;
estimate a density of the fuel;
obtain a predetermined fuel density range from the scanning of the tag;
compare the estimated density of the fuel estimated in real-time with the predetermined fuel density range;
open a valve to dispense a predetermined amount of the fuel, and recording a final inventory level after the dispensing the fuel, based on estimating that the density of the fuel is within the predetermined fuel density range;
compare the final inventory level with the initial inventory level before a next fueling; and
track fuel loss outside of the dispensing of the predetermined amount of the fuel, based on the comparing of the initial inventory level with one of the previously recorded inventory level or the final inventory level.

15. The fuel dispensing system of claim 14, wherein the tag is an NFC ID tag.

16. The fuel dispensing system of claim 14, wherein the tag comprises information related to: a fuel type, an allowable fuel density range, and current fuel inventory levels.

17. The fuel dispensing system of claim 14, wherein the smart device is configured to run on one of an Android platform, an iOS platform, a MacOS platform, or a Windows platform.

18. The fuel dispensing system of claim 14, wherein the communications processor communicates through at least one of wireless network, mobile network, Bluetooth, WAN, LAN, or combinations thereof.

19. The fuel dispensing system of claim 14, wherein the communications processor communicates using a short message service, an email, or combinations thereof.

20. A system for dispensing fuel, comprising:
a processing circuitry; and
a memory, the memory containing instructions that, when executed by the processing circuitry, configure the system to:
scan a tag by a scanner from a smart device, wherein the smart device also comprises a communications processor;
record an initial inventory level of the fuel in a fuel tank;
compare the initial inventory level to a previously recorded inventory level;
estimate a density of the fuel;
obtain a predetermined fuel density range from the scanning of the tag;
compare the estimated density of the fuel estimated in real-time with the predetermined fuel density range;
keep the valve from opening and communicate to relevant personnel about a difference in fuel density, upon estimating that the density is outside of the predetermined fuel density range;

compare the final inventory level with the initial inventory level before a next fueling; and tracking fuel loss outside of the dispensing of the predetermined amount of the fuel, based on the comparing of the initial inventory level with one of the previously recorded inventory level or the final inventory level.

\* \* \* \* \*